Sept. 9, 1952 R. T. BURNETT 2,609,708
TRANSMISSION
Filed Sept. 13, 1949
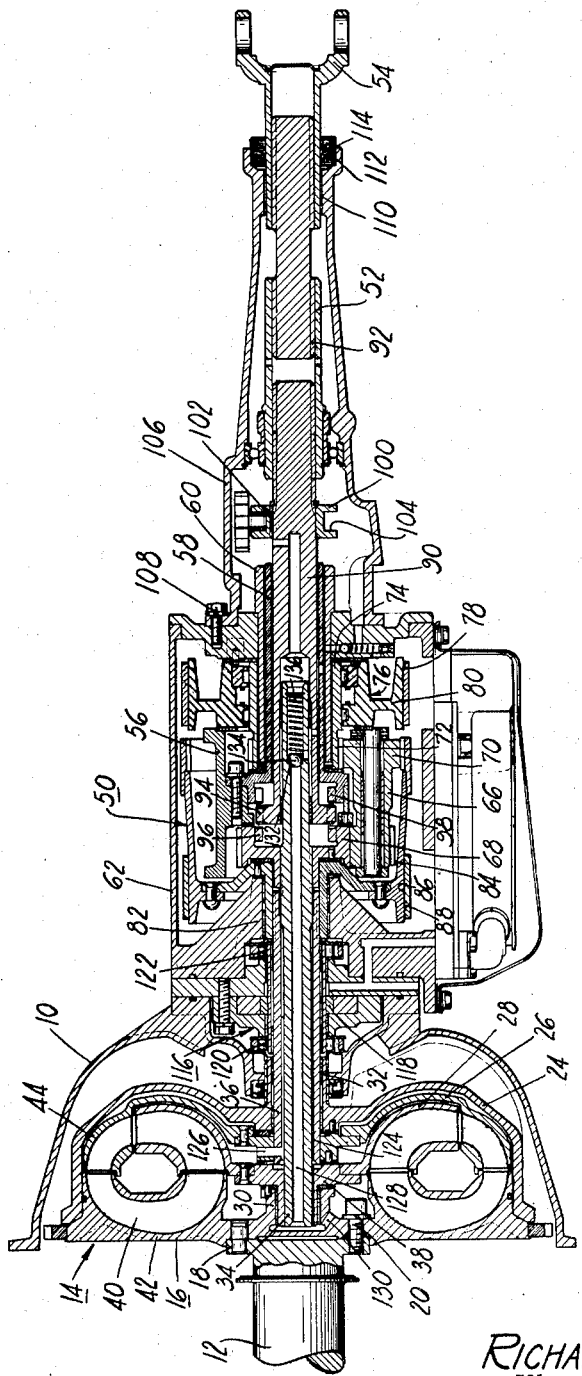
INVENTOR.
RICHARD T. BURNETT
BY Cecil J Arens
ATTORNEY Patented Sept. 9, 1952

2,609,708

UNITED STATES PATENT OFFICE 2,609,708

TRANSMISSION

Richard T. Burnett, South Bend, Ind., assignor to Bendix Aviation Corporation, South Bend, Ind., a corporation of Delaware Application September 13, 1949, Serial No. 115,509

6 Claims. (Cl. 74—677)

This invention relates to transmissions embodying hydrokinetic torque converters.

It is an object of the invention to provide a hydrokinetic transmission having high and low gear range.

Another important object of the invention resides in the provision of a transmission equipped with a hydrokinetic torque converter having rotatable bladed turbine and reaction wheels and a planetary gear train comprising sun and ring gears connected respectively to the reaction and turbine wheels, and wherein the output shaft is arranged to be connected to the aforementioned sun gear or to the planet carrier on which pinions are carried for interposition between said ring and sun gears.

The above and other objects and features of the invention will be apparent from the following description of the apparatus taken in connection with the accompanying drawing which form a part of this specification, and in which the single figure illustrates a longitudinal sectional view of a transmission embodying the device of my invention.

Referring now to the drawing for a detailed description of the transmission of my invention, the reference numeral 10 designates a housing which may be secured to an automobile, not shown, in any suitable manner. Energy from the engine is transferred to an input or crankshaft 12, drivably connected to a hydrokinetic torque converter 14.

The torque converter comprises an impeller wheel 16 carried by a flange 18 integral with one end of the input shaft 12. Bolt studs 20 pass through the hub of the impeller wheel and threadedly engage the flange 18 to securely connect the impeller wheel in driving relationship to said shaft. The impeller wheel is further equipped with a housing 24, axially spaced apart from said impeller wheel 16 and together therewith provides an enclosure or shroud for turbine wheel 26 and reaction wheel 28. The impeller wheel 16 and housing 24 are formed with hollow cylindrical portions 30 and 32, coaxially located with respect to each other for receiving one end of concentric hollow shafts 34 and 36 respectively, which are carried thereby. The reaction wheel 28 is carried by a hub 38 splined to said one end of the concentric shaft 34. The turbine wheel 26 is secured to the said one end of the concentric shaft 36. The impeller, turbine, and reaction wheels are so arranged that together they provide a toroidal channel 40, through which fluid is circulated by impeller blades or vanes 42 mounted in a circular row on the impeller wheel. This moving fluid, set in motion by the impeller blades, acts on vanes 44 disposed in a circular row on the turbine wheel, to thereby impart rotation to the turbine wheel. The reaction wheel 28 is equipped with a circular row of vanes 46 which are intended to take reaction from the moving fluid as well as control the direction of flow of the fluid at the entrance of the impeller wheel.

A planetary gear train 50 is interposed between the torque converter 14 and output shaft 52, to the outer end of which a yoke 54 is splined. The gear train comprises a planet carrier 56, carried by a hollow shaft 58, concentrically located with respect to shaft 34, and revolvably supported interiorly of a tubular structure 60, integral with housing 62, which is securely fastened to the housing 10, in any suitable manner, such as by bolt studs, not shown. Double pinions 66 are rotatably mounted on the planet carrier for meshing engagement with a first sun gear 68, splined to the shaft 34, a ring gear 70 splined to the shaft 36, and a second sun gear 72, mounted on one end of a sleeve element 74, which is fitted over the exterior portion of the tubular structure 60. The sleeve element 74 forms one part of a free wheel device or one-way brake 76 interposed between the second sun gear 72 and a brake band 78, which is caused to engage the periphery of a wheel 80 when the transmission is connected for forward drive. This arrangement of the free wheel device holds the second sun gear 72 from backward rotation during torque multiplication in forward drive but allows the second sun gear to rotate freely forwardly beyond a one-to-one torque ratio of the transmission. With the brake band 78 released, that is, out of engagement with the wheel 80, the second sun gear is free to rotate in either direction. Any suitable means may be employed for controlling the action of the brake band, such as the conventional hydraulic systems now used.

The end of the housing 62 opposite from the tubular structure 60 is provided with a bearing structure 82, which carries the hub of ring gear 70 to which shaft 36 is splined.

The ring gear 70 is mounted on a drum 84, having a cylindrical surface 86, to be frictionally engaged by a brake band 88, the actuation of which may be accomplished in any suitable manner, such as hydraulic actuation, not shown. Engagement of the brake band 88 with the drum 84, connects the transmission for reverse drive, at which time the turbine wheel is fixed, so as to take the reaction, and the reaction wheel 28 and hence the first sun gear 68 is rotated in the reverse direction.

Means is interposed between the output shaft 52 and the planetary gear train to enable the operator of a vehicle to connect the transmission in high or low gear ratio. This means comprises an axially shiftable shaft member 90 carried internally of said hollow shaft 58, which as aforementioned is supported in the tubular structure 60. One end of this shaft member 90 is splined at 92 for driving engagement with the output shaft 52, the other end of the shaft member is provided with external splines 94 arranged for meshing engagement with either internal splines 96, formed integrally with the first sun gear 68, or internal splines 98, formed integrally with the sleeve 58.

The shaft member 90 is equipped with a collar 100, securely fixed thereto by a key 102. This collar is formed with a groove 104 to be engaged by any suitable shifting mechanism, manual or automatic, not shown, for moving the shaft member axially as required. A housing 106 envelopes the output shaft 52 and is fastened to the housing 62 by screws 108, only one of which is shown. That end of the housing 106 opposite from where it is joined to housing 62, is necked in to provide a bearing 110 for the yoke 54 into which the output shaft 52 is splined. The housing 106 is counterbored at 112 adjacent the bearing 110 to receive a seal 114, thus preventing the escape of fluid or grease from the transmission.

The shaft 34 is concentric with the shaft 36, and is supported at one end in the cylindrical portion 30, of the impeller wheel, and at the other end in the shaft 90.

For pressurizing the fluid in the toroidal channel of the torque converter a pump 116 is provided. The pump is furnished with a rotor 118 drivably interconnected with two one-way clutches 120 and 122. The one-way clutch 120 is interposed between the rotor 118 and the impeller wheel and the one-way clutch 122 is interposed between the rotor and the shaft 36, which is driven by the turbine wheel. The rotor 118 is driven either by the impeller wheel or the shaft 36 whichever is rotating faster. The pump per se forms no part of the present invention and is described and claimed in my application Serial No. 41,559, filed July 30, 1948.

Fluid from the pump 116 is forced into an annular space 124 between shafts 34 and 36, from whence it flows into the toroidal channel 40, via radial passage 126 extending through the shaft 36. The fluid can flow out of the toroidal channel into a longitudinal passage 128 of the hollow shaft 34, via passage 130 located in the impeller wheel. The exhaust end of the longitudinal passage is provided with a seat 132 on which a ball valve 134 is urged by a spring 136. The force of the spring acting on the ball valve determines the pressure in the system and is preselected at the time of installation.

Operation in forward drive high gear: The brake 78 is applied and the brake 88 is released. The axially shiftable shaft member 90 is moved so that the external splines 94 mesh with the internal splines 98 integral with the sleeve 58, which is secured to the planet carrier 56. When connected in this manner the fluid which is circulated by the impeller vanes 42 acts on the turbine wheel vanes to thereby cause the shaft 36 to rotate.

Rotation of the shaft 36 drives the ring gear 70 which is in meshing relationship with the double pinion gear 66. Since the second sun gear 72 is held against rotation in a backward direction through the free wheel device 76 and the brake 78, the reaction from the gear set and the reaction from the reaction wheel 28 are taken in this sun gear. The torque on the turbine wheel is multiplied through this gear set and transferred to the output shaft 52. At stall the torque on the output shaft is 2.9 times the input torque.

During this period of torque multiplication the reaction of the fluid in the torque converter tends to rotate the reaction wheel in a direction opposite to the direction of rotation of said impeller and turbine wheels. However, the reaction wheel 28 is interconnected with the planetary gear set so that rotation of the turbine wheel drives the reaction wheel at a fixed speed ratio relative thereto and in the same direction but at a lower speed with respect to the impeller and turbine wheels. That is, the reaction wheel has a positive forward rotation at this time due to the driving action of the turbine wheel through the gear set. The output shaft is at this time being driven at a reduced speed relative to the input shaft speed but at an increased torque ratio.

When the torque ratio of the transmission is one-to-one the fluid in the converter is acting on the reaction wheel in a forward direction so as to drive the same in the direction of the turbine and impeller wheels. At this time the reaction in the second sun gear 72 is zero and the combined torques of the sun gear 68, and ring gear 70, are transmitted to the planet carrier 56, thus driving the output shaft 52.

Operation in forward drive low gear: The transmission is connected in low gear when additional torque is desired for unusually heavy loads. Brake band 78 is engaged the same as in high gear but the shiftable shaft member 90 with which external spline 94 is integral, is shifted to the left so that the said external spline 94 meshes with the internal spline 96. With this arrangement, the output shaft is being driven at a reduced speed ratio with respect to the input shaft and at an increased torque ratio. For example, the turbine torque which at stall is about 2.6 times input torque is multiplied in the gearing by a ratio of 2.86 putting into the output shaft 7.4 times engine torque, but the negative guide wheel torque of 1.6 times engine torque is substracted from the output shaft leaving a net torque ratio of 5.8 (as compared to 2.9 in high gear). The reaction wheel and the output shaft, both of which are driven through the first sun 68, will be rotated at a fixed reduction ratio with respect to the turbine wheel.

Although this invention has been described in connection with certain specific embodiments, the principles are susceptible of numerous other applications that will readily occur to persons skilled in the art.

Having thus described the various features of the invention, what I claim as new and desire to secure by Letters Patent is:

I claim:

1. In a transmission, the combination of a hydrokinetic torque converter, a planetary gear train comprising ring and first sun gears interconnected with said torque converter, a planet carrier mounting pinions interposed between said first sun and ring gears, a second sun gear arranged in mating relationship to one of said pinions, a one-way brake connected to said second sun gear, an output member, and means for connecting the output member to the first sun gear or planet carrier.

2. In a transmission, the combination of a hydraulic torque converter including rotatable bladed turbine and reaction wheels, a planetary gear train provided with a sun gear connected to said reaction wheel, a ring gear connected to said turbine wheel, a planet carrier mounting a double planet pinion of different pitch diameters interposed between said sun and ring gears, one of said pinions meshing with the sun gear and the other of said pinions meshing with the ring gear, an output member, and means for connecting the output member in different gear ratios, said means including an axially shiftable device having a first position for drivably connecting the member to said sun gear and a second position for drivably connecting the member to the planet carrier.

3. In a transmission, the combination of a hydrokinetic torque converter including rotatable bladed turbine and reaction wheels, a planetary gear train provided with a first sun gear interconnected with said reaction wheel, a ring gear interconnected with said turbine wheel, a second sun gear, a planet carrier having pinions thereon interposed between said gears and intermeshing therewith, means for holding said second sun gear against rotation in one direction, an output member, and means for connecting said output member to the first sun gear to establish a low gear drive or to said planet carrier, to establish a high gear drive.

4. In a transmission, the combination of a hydraulic torque converter including rotatable bladed turbine and reaction wheels, a planetary gear train provided with a sun gear connected to said reaction wheel, a ring gear connected to said turbine wheel, a planet carrier mounting a double planet pinion of different pitch diameters interposed between the sun and ring gears with the pinion of smaller diameter meshing with the sun gear and the pinion of larger diameter meshing with the ring gear, an output shaft, and means for connecting the output shaft for rotation at different speeds including a device having a first position for drivably connecting the output shaft to the sun gear and a second position for drivably connecting said shaft to the planet carrier.

5. In a transmission, the combination of a hydrokinetic torque converter including rotatable bladed turbine and reaction wheels, a planetary gear train provided with a first sun gear interconnected with said reaction wheel, a ring gear interconnected with said turbine wheel, a second sun gear, a planet carrier mounting a double planet pinion of different pitch diameters interposed between the sun and ring gears with the pinion of smaller diameter meshing with the first sun gear and the pinion of larger diameter meshing with the ring and second sun gears, means for holding said second sun gear against rotation in one direction, and means including an output member connectible to the first sun gear or said planet carrier to thereby establish the output member in one of two forward gears of different ratios.

6. In a transmission, the combination of a hydrokinetic torque converter including rotatable bladed turbine and reaction wheels, an output member, a planetary gear train interposed between the torque converter and said output member and provided with a first sun gear interconnected with said reaction wheel, a ring gear interconnected with said turbine wheel, a second sun gear, a planet carrier mounting a double planet pinion of different pitch diameters interposed between the sun and ring gears with the pinion of smaller diameter meshing with the first sun gear and the pinion of larger diameter meshing with the ring and second sun gears, means for holding said second sun gear against rotation in one direction, and means for connecting the output member to the first sun gear or to the planet carrier to thereby establish the transmission in one of its forward gear drives.

RICHARD T. BURNETT.

REFERENCES CITED

The following references are of record in the file of this patent:

UNITED STATES PATENTS

| Number | Name | Date |
|---|---|---|
| 2,039,147 | Dodge | Apr. 28, 1936 |
| 2,162,803 | England | June 20, 1939 |
| 2,220,174 | Ravigneaux | Nov. 5, 1940 |
| 2,277,214 | Dodge | Mar. 24, 1942 |
| 2,325,876 | Pollard | Aug. 3, 1943 |
| 2,403,594 | Gillard | July 9, 1946 |
| 2,441,490 | Jandasek | May 11, 1948 |
| 2,456,328 | Schneider | Dec. 14, 1948 |